Sept. 9, 1924.

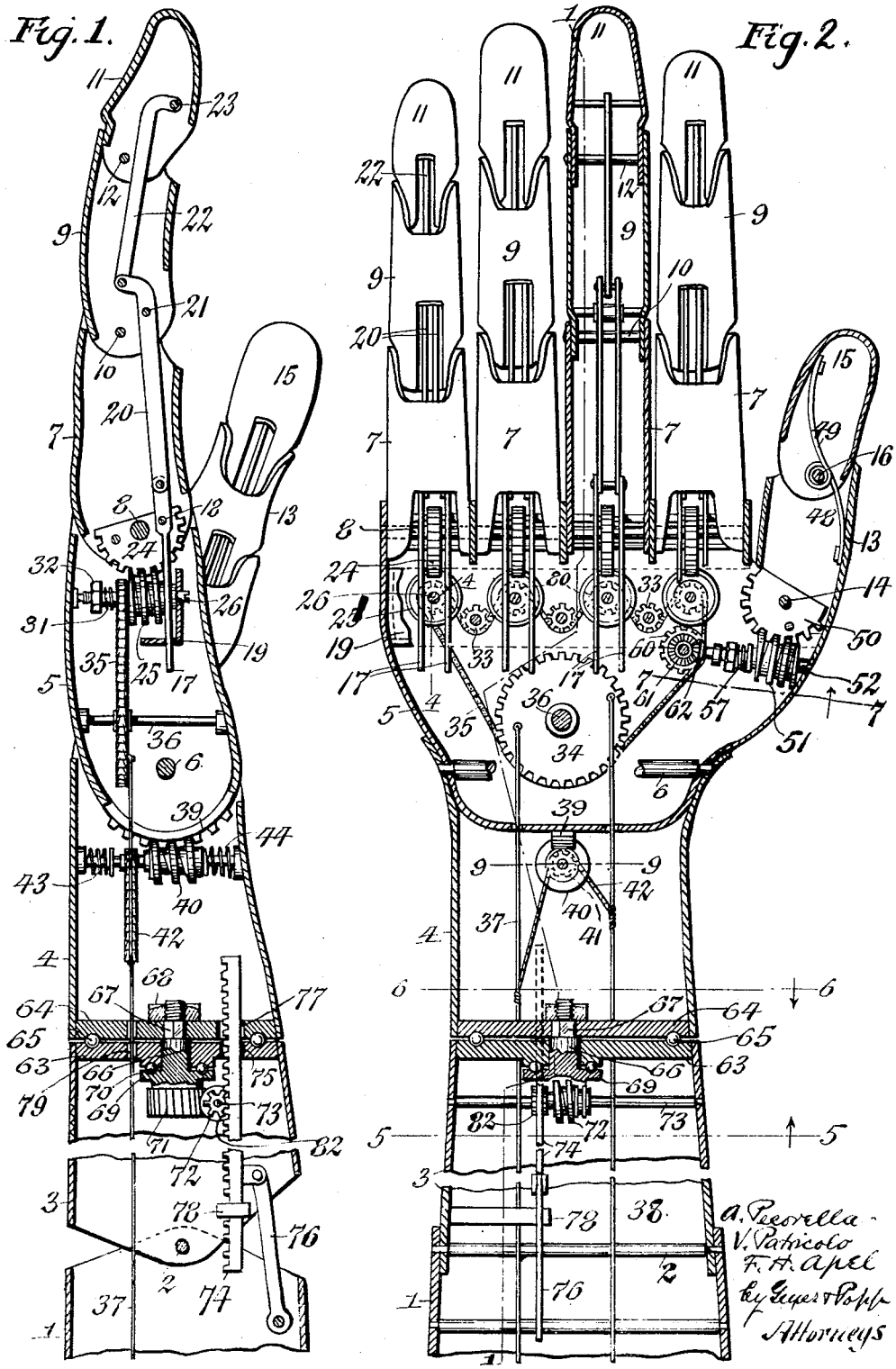

A. PECORELLA ET AL

ARTIFICIAL LIMB

Original Filed Jan. 24, 1919   2 Sheets-Sheet 2

1,507,682

Alberto Pecorella
Vincent Patricolo
Frederick H. Apel
INVENTORS
BY Geyer & Popp
ATTORNEYS Patented Sept. 9, 1924.

1,507,682

UNITED STATES PATENT OFFICE.

ALBERTO PECORELLA AND VINCENT PATRICOLO, OF BUFFALO, AND FREDERICK H. APEL, OF ATHOL SPRINGS, NEW YORK, ASSIGNORS, BY MESNE ASSIGNMENTS, TO LIVINGSTON ARTIFICIAL LIMB COMPANY, OF NEW YORK, N. Y., A CORPORATION OF DELAWARE.

ARTIFICIAL LIMB.

Substitute for abandoned application Serial No. 272,808, filed January 24, 1919. This application filed March 17, 1924. Serial No. 699,950.

*To all whom it may concern:*

Be it known that we, ALBERTO PECORELLA, a citizen of the United States, and resident of Buffalo, in the county of Erie and State of New York, VINCENT PATRICOLO, a subject of the King of Italy, and residing at Buffalo, in the county of Erie and State of New York, and FREDERICK H. APEL, a citizen of the United States, residing at Athol Springs, in the county of Erie and State of New York, have invented new and useful Improvements in Artificial Limbs, of which the following is a specification.

This invention relates to an artificial limb and more particularly to a limb which is designed to replace the arm, forearm, wrist, hand, fingers and thumb of a person.

It is the object of this invention to provide an artificial limb of this character which can be operated so as to simulate the action of the corresponding part of a living person very closely and with ease and comfort, so that the user will be able to obtain nearly as much use of the same as from a real hand.

This application is a substitute for abandoned application No. 272,808, filed January 24, 1919.

Figure 3:
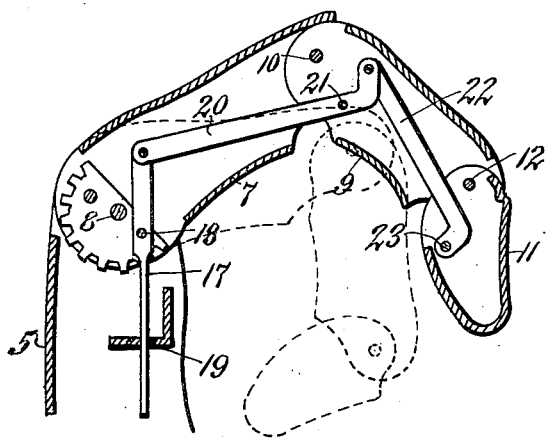
Figure 4:
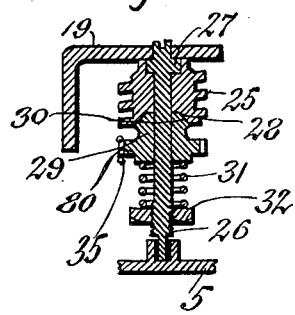
Figure 5:
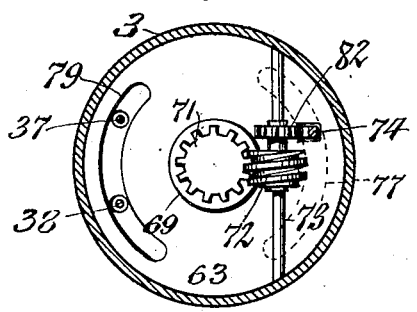
Figure 6:
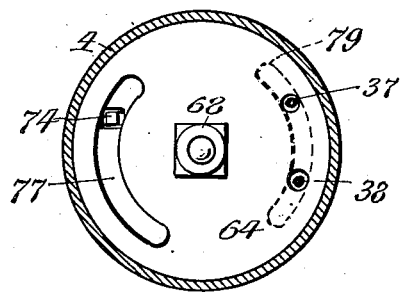
Figure 8:
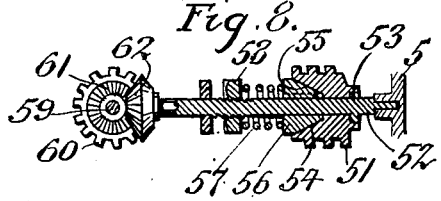
Figure 7:
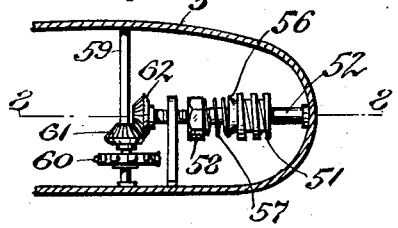
Figure 9:
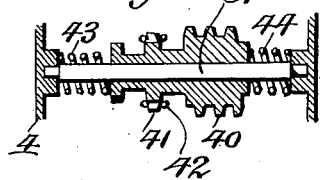

In the accompanying drawings:

Figure 1 is a vertical longitudinal section of an artificial limb embodying our improvements, the section being taken perpendicular to the plane of the palm of the hand and on line 1—1, Fig. 2. Figure 2 is an elevation, partly in section, of the artificial limb viewed from the palm-side of the hand. Figure 3 is a fragmentary longitudinal section showing one of the fingers of the artificial limb in its folded or closed position. Figure 4 is a fragmentary section, on an enlarged scale, of part of the means for actuating one of the fingers, the section being taken on line 4—4, Fig. 2. Figures 5 and 6 are cross sections taken on the correspondingly numbered lines in Fig. 2. Figure 7 is a fragmentary cross section taken on line 7—7, Fig. 2. Figure 8 is a section, on an enlarged scale, taken on line 8—8, Fig. 7. Figure 9 is a section, on an enlarged scale, taken on line 9—9, Fig. 2.

Similar characters of reference indicate corresponding parts throughout the several views.

Our improvements are adapted to be associated with an arm-section 1 which may be attached to the stump of the real arm in any suitable manner, a forearm 3 which is pivotally connected at its rear end with the front end of the arm by means of a transverse pin 2, a wrist 4 which is pivotally connected at its rear end with the front end of the forearm so as to be capable of turning relatively thereto about a longitudinal axis, a palm 5 which is pivotally connected at its rear end with the front end of the wrist by means of a transverse pin 6 so as to be capable of turning laterally relatively to the palm, a plurality of digits, the fingers of which consist each of a first section 7 pivotally connected with the palm by a pin 8, a second section 9 pivotally connected with the first section by means of a pin 10, and a third section 11 pivotally connected with the second section by means of a pin 12, and a thumb comprising a first section 13 pivoted on the palm by a pin 14 and a second section 15 pivoted on the first section by means of a pin 16. All of these several members are preferably constructed of hollow or tubular form in any suitable and approved manner so that the mechanism for operating the same may be located in the interior thereof.

Inasmuch as the means for actuating the several fingers for folding or closing and unfolding or opening the same are alike, the following description applying to one of them will apply to all of the several fingers.

24 represents a worm-gear segment arranged within the inner part of the first section of each finger and connected therewith concentrically relative to the pivotal connection between this finger section and the palm. With this worm-segment engages a worm 25 the axis of which is arranged perpendicular to the plane of the palm. Upon turning this worm in one direction or the other, the first finger-section will be turned either into its open or closed position. Within the inner part of each finger-section and the adjacent part of the palm is arranged a first lever 17 which is pivoted between its rear and front arms by means of a pin 18 on the adjacent part of this finger section on one side of the axis of the pivotal connection 8 between this finger section and the palm. The inner or rear arm of this first lever is free to slide lengthwise but incapable of turning, this being accomplished by passing this rear arm through an opening formed in a cross bar 19 which is mounted rigidly on the inner side of the palm. 20 represents a second lever which is arranged partly in the first and second finger-sections and is pivoted between its arms by means of a transverse pin 21 on the second finger-section on one side of the pivotal connection 10 between the first and second finger-sections. The inner arm of this second lever is pivoted to the front arm of the first lever 17 and the front or outer arm of this second lever is connected with the inner end of a link 22 which latter is arranged within the second and first finger sections and has its front end connected by a pivot 23 with the third finger section on one side of the pivotal connection 12 between the second and third finger sections.

In the position of the parts shown in Figs. 1 and 2, the several fingers are all unfolded to their maximum extent in which position the first and second levers 17, 20 and the link 22 are arranged substantially in line, the pivot of the first lever is arranged outwardly from the pivot 8 which connects the palm and the first section and the pivots 21, 23 of the second lever and the link are arranged a considerable distance outwardly from the corresponding pivots 10, 12, which connect the second finger section with the first and third sections. Upon turning the worm 25 in the direction for folding or closing the first finger-section, the first lever 17 will slide through the cross bar 19 without, however, rocking on its fulcrum 18 to any appreciable extent, which relative movement of the first finger section and the first lever will cause an inward pull upon the second lever 20 which is connected with the second finger section, so that this second lever at this time operates as a link and causes the second finger-section to be shifted into its folded or closed position, as indicated in Fig. 3. Inasmuch as the relative position of the second lever and the second finger section is changed by this last-mentioned operation, a pull is produced by the front arm of the second lever 20 upon the third finger section through the medium of the link 22, so that this third finger section is shifted from its unfolded position shown in Fig. 1, to its folded or closed position indicated in Fig. 3. A reversal of the turning motion of the first finger-section by operation of the worm-gear and worm, will cause the second and third finger-sections to be unfolded from the position shown in Fig. 3 to that shown in Fig. 1, through the action of the first and second levers 17, 20 and the link 22.

A construction similar to that for operating each of the fingers is employed for operating the first and second sections of the thumb. This thumb-operating movement comprises a worm-gear segment 50 secured to the inner thumb-section 13 concentric with the pivot thereof, a worm 51 arranged at right angles to the worms of the finger-operating mechanism and meshing with the thumb gear-segment. The outer or second thumb-section is yieldingly held in its unfolded position by a spring 49 which preferably has a central coil surrounding the pivot 16 while its opposite ends are connected respectively with the inner and outer thumb-sections, as shown in Fig. 2. Upon turning the first thumb-section inwardly by means of the worm 51 and worm-gear 50, the outer thumb-section moves bodily with the inner thumb-section until the outer thumb-section engages the adjacent first finger at which time the thumb-spring 49 yields and permits the outer thumb-section to stand still independently of the inner thumb-section and thereby enable the hand to close in imitation of a fist without breaking any of the parts. A reversal in the movement of the thumb-worm and gear-segment causes the thumb-sections to be again unfolded.

An actuating mechanism is provided for the several digits whereby the same may be simultaneously closed and opened but which is so organized that if any one of these digits encounters any obstruction which resists its movement in one direction or the other, such digit may remain at rest independently of the remaining digits and thereby enable the hand when the same is closed to grasp irregularly-shaped objects in imitation of the operation of the human hand. This is accomplished in the present case by associating with each digit, means having parts which cooperate frictionally with each other so that the main actuating mechanism for the several digits may slip with reference to one or more of the digits without interfering with the closing or opening operation of the remaining digits whose freedom of motion is not obstructed. The preferred form of this friction device employed with each of the fingers, as shown in the drawings, is constructed as follows:

26 represents a shaft upon which the finger-worm 25 is mounted and which is seated at its opposite ends in bearings formed in the top of the palm 5 and in the adjacent part of the cross bar 19. At its inner end the worm 25 engages with a shoulder or collar 27 on the shaft 26 and on its outer end the same is provided with a conical friction surface 28 which is engaged by a correspondingly-shaped conical friction surface 30 formed on a driving-head 29 mounted on the adjacent part of the worm shaft 26. This driving-head is yieldingly pressed with its friction-face against that of the adjacent worm by means of a spring 31 surrounding the outer part of the shaft 26 and engaging its inner end with the driving-head while its outer end bears against a screw nut 32 engaging with the threaded outer part of the shaft 26, as shown in Fig. 4.

80 represents a sprocket wheel or rim formed on the outer part of each of the driving-heads. Between adjacent sprocket wheels of the several finger worm-gears are arranged intermediate or idle sprocket wheels 33 which are pivoted on the adjacent part of the palm. Within the central part of the palm is arranged a main or master sprocket-wheel 34 which is mounted on a spindle 36 turning on the palm in bearings which are arranged thereon at right angles to the plane of the palm. A sprocket chain-belt 35 passes around the main sprocket wheel 34, the driven sprocket wheels 80 of the several driving heads and the idle sprocket wheels 33, so that upon turning the main sprocket wheel in one direction or the other, all of the driving heads will be simultaneously turned for opening or closing the fingers. If, at this time the fingers meet with no obstruction, the frictional connection between the driving heads and the adjacent worm wheels will cause the several fingers to open and close in unison, but if the movement of any one or more of the fingers is interfered with, the respective finger will lag behind due to the slipping action of the frictional contact between the corresponding driving head and worm while the remaining fingers which meet with no obstruction will operate normally during their opening and closing movement. If a finger has been permitted to close only partly by reason of meeting an obstruction in advance of the remaining fingers, then this finger during the reversal in the movement of the driving sprocket wheel 34 and associated parts will reach its fully open position in advance of the remaining fingers and when the latter are also moved into their fully open position the driving head of the respective finger which has already reached its open position will simply slip in frictional contact with the respective worm wheel until the several parts have been all brought back into their uniformly open position.

In order to thus insure the full opening and closing action of the several fingers, the rotary movement of the primary or driving sprocket wheel 34 is so determined that the finger-operating mechanism will receive motion from this main sprocket wheel in excess of that required for fully opening and closing the same. This motion of the driving sprocket wheel 34 may be derived from any suitable source and transmitted thereto by any suitable means. For instance, as shown in the drawings, this may be effected by a closing line 38 and an opening line 37 arranged in the wrist, forearm and arm and connected at their rear ends in any suitable manner with some movable member of the body, so that these two lines may be alternately drawn in opposite directions, the inner or front ends of these lines being connected with the driving gear wheel on diametrically opposite sides thereof, as shown in Fig. 2, so that upon pulling on the closing line the driving wheel will be turned in the direction for closing the fingers and when pulling upon the opening line the several fingers will be opened.

Owing to the location of the thumb on the palm at an angle to the several fingers, a slight modification in the form of the mechanism for transmitting motion from the chain belt 35 to the thumb-worm is employed, which mechanism in its preferred form is shown in Figs. 2, 7 and 8 and constructed as follows:

52 represents a worm shaft arranged within the palm parallel with the plane thereof and journaled in bearings therein. The thumb worm 51 is connected frictionally with this shaft so that when the thumb is free to turn this worm will rotate with its shaft but if the thumb meets with an obstruction this shaft will be able to turn independently of the thumb-worm. For this purpose the outer end of the thumb-worm engages with a shoulder or collar 53 on a thumb-shaft 52 and the inner end of this worm is provided with a conical friction face 54 which is engaged by a correspondingly-shaped conical friction face 55 on a driving head 56 which is splined on this shaft and pressed yieldingly against the respective worm by means of a spring 57 surrounding this shaft and engaging its outer end against this driving head while its inner end engages with a screw nut 58 arranged on this shaft, as best shown in Fig. 8. A rotary motion is imparted to the thumb-operating shaft 52 by means of an intermediate shaft 59 journaled on the palm and provided with a driven sprocket wheel 60 which is engaged by the chain belt 35, and also provided with a beveled gear-wheel 61 meshing with a beveled gear wheel 62 on the thumb-operating shaft 52. In this manner the thumb-sections are folded and unfolded in unison with the finger-sections in substantially the same manner, so that the thumb-sections either move with the finger-sections or are free to stay behind in the event that they strike an obstruction which resists the movement of these thumb-sections in either direction.

The pivotal connection between the palm and the wrist is intended to permit turning the palm laterally with reference to the wrist in imitation of the action of the human hand in this respect. The means whereby this is accomplished are preferably constructed as follows:

40 represents a worm arranged within the wrist and meshing with a worm gear segment 39 mounted on the inner end of the palm concentric with the pivoted connection between the same and the wrist. This palm operating worm is provided with a driven sprocket wheel 41 which receives a chain or sprocket belt 42 one end of which is attached to the digit opening line 37 and the other to the digit closing line 38, as shown in Figs. 1 and 2. By this means a rearward pull upon the closing line will cause the palm operating worm to be turned in the direction for tipping the palm laterally inward with reference to the wrist at the same time that the digits are closed relatively to the palm, and a rearward pull upon the opening line will cause the palm to be swung outwardly relatively to the wrist at the same time that the digits are again moved into their open or unfolded position.

When pressing the palm in either direction against an object it is desirable to permit the same to yield to some extent in order to simulate the action of the human palm in this respect when engaging an unyielding object. This is possible in the present case by mounting the palm-operating worm and sprocket wheel upon a spindle 81 which is mounted within the palm, so that this worm and sprocket wheel are capable of longitudinal movement on the spindle and providing two springs 43, 44 which are mounted on this spindle and engage their inner ends with opposite ends of this worm and sprocket wheel while their outer ends engage with the adjacent bearings of this spindle, as shown in Fig. 9, or other suitable shoulders or abutments which may be provided within the palm for this purpose. The tensions of the springs 43, 44 are so determined that they normally operate to hold the palm-operating worm and sprocket wheel in their central position, but if a lateral pressure is exerted upon the palm or the fingers mounted thereon independently of that which is exerted by the palm-operating worm, then the latter together with its sprocket wheel will be moved lengthwise on the spindle 81 on one direction or the other and flex one or the other of the springs 43, 44, which yieldingly resist this deflection of the palm or fingers. When such deflection ceases the righting springs 43, 44 again return the palm-operating worm into its central or neutral position together with the parts mounted thereon.

Although the pivotal connection between the wrist and the forearm may be effected by various means that which is shown in the drawings is suitable and preferred and as there shown the same comprises two plates or disks 63, 64, which are secured to the opposing ends of the forearm and wrist, respectively, a ball bearing 65 interposed between the outer marginal parts of these plates, a pivot bolt having a cylindrical rear part 66 which engages with a cylindrical opening in the forearm plate, a square front part 67 which engages with a square opening in the wrist plate, a screw nut 68 applied to the screw threaded front end of the bolt and engaging with the front side of the wrist plate, and a head 69 arranged at the rear end of the bolt shank and engaging by means of an interposed ball bearing 70 with the rear side of the forearm plate, as shown in Figs. 1, 2, 5 and 6. By means of this pivotal connection between the wrist and forearm, these two members are free to turn relatively to each other about a longitudinal axis without any binding or cramping of the parts.

The rotary motion of the wrist with reference to the forearm is preferably derived by utilizing the relative turning motion of the forearm and arm. This is preferably accomplished by means of a worm-wheel 71 arranged on the head 69 of the pivot or coupling bolt, a transverse shaft 73 arranged within the forearm and journaled in suitable bearings thereon, a worm 72 mounted on this shaft and meshing with the worm wheel 71, a gear pinion 82 mounted on the shaft 73, a gear rack 74 meshing with the gear pinion 82 and guided in the forearm plate 62 and in a bracket 78 on the forearm, and a link 76 pivoted at its front end on the rack 74 and pivotally connected at its rear end with the arm 1 on one side of the pivot 2 between this arm and the forearm, as shown in Figs. 1 and 2. By this means a turning motion of the forearm relatively to the arm causes the gear rack to be shifted lengthwise of the forearm and turn the gear pinion 82 which latter causes the worm 72 to rotate the worm wheel 71 together with the wrist and parts mounted on the latter.

In order to avoid interference between the gear rack and the wrist plate 64 the latter is provided with a segmental slot 77 which receives the front part of the rack, as shown in Fig. 5; and for the same reason the forearm plate 63 is provided with a segmental slot 79 which receives the opening and closing lines 38, 37, as shown in Fig. 5.

It will be noted that the several devices embodied in this invention are comparatively simple in construction considering the functions which are designed to perform, the same are not liable to get out of order and are capable of being operated easily and noiselessly, and they also permit of shifting the several movable members so that they simulate the corresponding human parts with great nicety and permit of using the hand in practically the same way as the natural hand.

We claim as our invention:

1. An artificial limb, comprising a palm, a digit having a first section pivoted on said palm and a second section pivoted on said first section, and means for operating said first section comprising a lever pivoted on said first finger section on one side of the pivotal connection between said palm and first section, a guide on the palm for the rear arm of said lever, and an operating member connected at its rear end with the front arm of said lever and pivotally connected at its front part with said second section on one side of the pivotal connection between the first and second sections.

2. An artificial limb, comprising a palm, a digit having a first section pivoted on the palm, a second section pivoted on the first section and a third section pivoted on the second section, and means for operating the second and third sections comprising a first lever pivoted on the first section on one side of the pivotal connection between the latter and the palm, a guide on the palm for the rear arm of said first lever, a second lever pivoted on the second section on one side of the pivotal connection between the first and second section and having its rear arm pivotally connected with the front arm of the first lever, and a link pivotally connected at its rear end with the front arm of said second lever while its front end is connected with said third section on one side of the pivotal connection between said second and third sections.

3. An artificial limb comprising a palm, a digit pivoted on said palm, and means for shifting the digit relatively to said palm including a driven rotary member and a driving rotary member which engage each other frictionally, means for transmitting motion from said driven member to said digit, and an operating device connected with said driving member.

4. An artificial limb, comprising a palm, a digit pivoted on said palm, and means for shifting the digit including a worm gear segment connected with said digit, a worm meshing with said segment and having a conical friction surface, a driving head having a conical friction surface engaging with the corresponding surface of the worm, and a spring which presses said worm and head together.

5. An artificial limb, comprising a palm, a digit pivoted on said palm, and means for shifting the digit including a worm gear segment connected with said digit, a worm meshing with said segment and having a conical friction surface, a driving head having a conical friction surface engaging with the corresponding surface of the worm, a spring which presses said worm and head together, and means for turning said head including a sprocket wheel connected with said head, and a chain belt passing around said sprocket wheel.

6. An artificial limb comprising a palm, a digit pivoted on said palm and means for shifting the digit relatively to said palm including a driven rotary member and a driving rotary member which engage each other frictionally, means for transmitting motion from said driven member to said digit, an operating device connected with said driving member, and means for locking the digit against inward or folding motion.

7. An artificial limb, comprising a palm, a plurality of digits pivoted to said palm, a multiple operating mechanism for actuating the several digits including a worm gear segment connected with each digit, a worm meshing with each worm segment and provided with a conical friction face, a driving head having a conical friction face engaging with the friction face of each of said worms, a spring for pressing each of said heads against the corresponding worm, a driven sprocket wheel turning with each of said heads, a master driving sprocket wheel, idle sprocket wheels arranged between adjacent driven sprocket wheels, and a chain belt passing around said master, driven and idle sprocket wheels.

8. An artificial limb comprising a palm, a plurality of digits pivoted to said palm, a multiple operating mechanism for actuating the several digits including a worm gear segment connected with each digit, a worm meshing with each worm segment connected with each digit, a worm meshing with each worm segment and provided with a conical friction face, a driving head having a conical friction face engaging with the friction face of each of said worms, a spring for pressing each of said heads against the corresponding worm, a driven sprocket wheel turning with each of said heads, a master driving sprocket wheel, two shifting lines connected with said master wheel on opposite sides of its axis, and a chain belt passing around said master and the several driven sprocket wheels.

9. An artificial limb, comprising a palm, digits pivoted on said palm, a wrist on which said palm is pivoted to turn laterally, and means for simultaneously operating said digits and palm.

10. An artificial limb, comprising a palm, digits pivoted on said palm, a wrist on which said palm is pivoted to turn laterally, and means for simultaneously operating said digits and palm including means which permit independent movement of said digits and palm.

11. An artificial limb, comprising a wrist, a palm pivoted on said wrist to turn laterally relatively to the latter, and means for operating said palm including a worm gear segment connected with said palm, a worm meshing with said segment, means for turning said worm, and yielding means for holding said worm against axial movement.

12. An artificial limb, comprising a wrist, a palm pivoted on said wrist to turn laterally relatively to the latter, and means for operating said palm including a worm gear segment connected with said palm, a worm meshing with said segment, means for turning said worm including a driven sprocket wheel connected with said worm and a chain belt passing around said sprocket wheel, and yielding means for holding said worm against axial movement.

13. An artificial limb, comprising a wrist, a palm pivoted on said wrist to turn laterally relatively to the latter, and means for operating said palm including a worm gear segment connected with said palm, a worm meshing with said segment, means for turning said worm including a driven sprocket wheel connected with said worm and a chain belt passing around said sprocket wheel, a shaft upon which said worm and sprocket wheel are mounted, and springs arranged on said shaft and bearing against opposite ends of said worm and sprocket wheel.

14. An artificial limb, comprising a forearm, a wrist pivoted on said forearm to turn about a longitudinal axis, a worm wheel connected with said wrist, a worm mounted on said forearm and meshing with said worm wheel and means for actuating said worm.

15. An artificial limb comprising a forearm, a wrist pivoted to turn on said forearm about a longitudinal axis, an arm to which said forearm is pivoted to turn laterally, and means for turning said wrist including a worm wheel connected with said wrist, and a worm meshing with said worm wheel and operatively associated with said arm to receive motion therefrom.

16. An artificial limb, comprising a forearm, a wrist pivoted on said forearm to turn about a longitudinal axis, an arm to which said forearm is pivoted to permit the latter to turn laterally, and means for turning said wrist by motion from said arm, including a worm wheel connected with said wrist, a worm mounted on said forearm and meshing with said worm wheel, a gear pinion connected with said worm, and a gear rack meshing with said pinion and pivotally connected with said arm.

In testimony whereof we affix our signatures.

ALBERTO PECORELLA.
VINCENT PATRICOLO.
FREDERICK H. APEL.